July 20, 1926.  
W. H. LAWRENCE  
FLOORING FOR CARS AND THE LIKE  
Filed Dec. 6, 1924

1,592,833

Inventor:  
William H. Lawrence  
By Gillson, Mann & Cox  
Attys.

Patented July 20, 1926.

1,592,833

UNITED STATES PATENT OFFICE.

WILLIAM H. LAWRENCE, OF NEW YORK, N. Y., ASSIGNOR TO JOHNS-MANVILLE, INC., A CORPORATION OF NEW YORK.

FLOORING FOR CARS AND THE LIKE.

Application filed December 6, 1924. Serial No. 754,277.

This invention relates to flooring and has for its principal object to provide a floor composed of a foundation structure having sufficient strength to carry the load, and a covering that is light in weight, resilient and easy under foot, and not slippery; that will flex with the foundation structure without cracking and without parting from the foundation structure; that will resist moisture and protect the foundation structure from moisture and other corroding agents; that will resist heat and retard fire; that will not form dust in service, and that can be easily and economically placed and repaired.

These and other objects are accomplished by covering the foundation structure with bituminous concrete including a well graded aggregate of porous or cellular material.

Further objects and advantages of the invention will become apparent as the disclosure proceeds and the description is read in connection with the accompanying drawings illustrating a selected embodiment of the invention, and in which—

Figure 1:
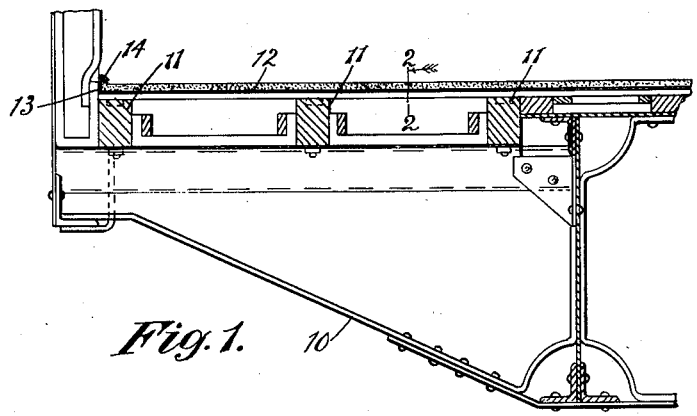
Fig. 1 is a partial sectional view of a modern steel car with a floor made according to this invention.
Figure 2:
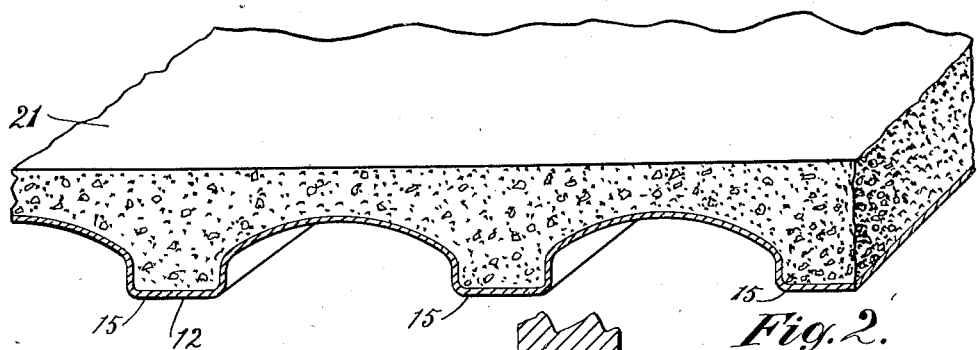
Fig. 2 is a sectional view taken on the line 2—2 of Fig. 1.

In steel passenger cars the underframe 10, (Fig. 1), is equipped with nailing strips 11, and on these is fastened a sheet steel foundation floor 12 having its edges turned upwardly, as indicated at 13, and downwardly and inwardly, as shown at 14. This foundation is made of thin steel and, in order to give it the necessary rigidity, is provided with corrugations, or ribs 15 (Fig. 2).

Upon this foundation is laid a coating approximately one inch in thickness, of concrete composed of a cellular mineral material, like coke, or such material mixed with a cellular vegetable material like cork or sawdust, or a cellular animal material like granulated leather waste and a fine mineral material like limestone dust, pulverized slate, fine sand and a bituminous cement. The cellular form of coke makes it possible to use that material for all the graded sizes down to the relatively fine, without rendering the aggregate heavy, but there is no particular advantage in using coke for the fine particles since in such size it no longer contains sufficient cells, or voids, to give it the advantage of lightness.

Cork is lighter than coke and on that account is of some advantage for use in the large granular form, but when cork is reduced to relatively small grains and mixed with asphalt, the voids will not be filled unless the mixture is compressed and held under pressure until set. This is also true of sawdust and granulated leather and cellular material of other than mineral origin. However, if the cork, sawdust, and the like used are chiefly in relatively large pieces and the remainder of the aggregate is mineral matter, the voids will become filled in the operation of mixing with the bituminous cement, and no pressure need be applied during the time required for setting.

For these reasons I prefer to use coke for the principal portion of the aggregate including the graded sizes down to the point where they cease to be cellular, then add sufficient limestone dust, pulverized cement, or the like to fill the small interstices and then provide only sufficient asphalt to cover the surfaces of the aggregate and cement them together. With the properly graded sizes this concrete can be produced with a weight not exceeding eighty-five pounds per cubic foot.

Using cork and coke in about equal parts by volume concrete can be produced with a weight not exceeding eighty-three pounds per cubic foot, and with a similar mixture of sawdust and coke the weight can be reduced to seventy-eight pounds per cubic foot.

The work of mixing is facilitated by first incorporating the fine aggregate with the asphalt and then adding the larger particles of aggregate. The asphalt is placed in a mixer equipped with means for heating and mechanically agitating the contents. When it has become fluid, the fine material, for example, 200 mesh, limestone dust is added slowly and the mass agitated to work the fine particles into the asphalt individually and eliminate balls or lumps. When the fine material and asphalt are thoroughly mixed the larger aggregate is added slowly and the agitation continued until the mass becomes homogenous. It is then deposited in a thin layer on the foundation structure of the floor and worked with floats to produce the desired form of surface and to bring an excess of asphalt to that surface, after which it is allowed to cool and set.

Because of the difficulty of properly mixing the fine aggregate and asphalt it is preferably done as a separate process where large stills equipped with mechanical agitators can be economically operated and the mixture formed into blocks of convenient size for handling and shipping, or mastic blocks heretofore made for other purposes may be used when the character of asphalt and the quantities of limestone dust or limestone dust and sand are suitable.

At the job the blocks are broken and melted down with an asphaltic flux and the remaining aggregate worked in.

When a plurality of cellular materials such as cork and coke or sawdust and coke are to be used they should be first thoroughly mixed and then added to the melted blocks and asphalt.

The following proportions have been arrived at by experimentation and are at present preferred:

No. 1.

560 lbs. coke (all passing 10″ mesh), 240 lbs. mastic blocks, 90 lbs. flux, the analysis of which shows the content as follows—

Coke 63%, flux 10.1%, sand 7.2%, matrix 3.4%, limestone 16.3%.

No. 2.

320 lbs. equal parts by volume of cork, passing ¼″ mesh and coke, passing No. 10 mesh, the analysis of which shows the content as follows—

Equal parts by volume, cork passing ¼″ mesh and coke passing No. 10 mesh 49.3%, flux 13.7%, sand 10%, matrix 4.8%, limestone 22.2%.

No. 3.

320 lbs. equal parts by volume passing No. 10 mesh of coke and sawdust, the analysis of which shows the content as follows—

Equal parts by volume passing No. 10 mesh of coke and sawdust 49.3%, flux 13.7%, sand 10%, matrix 4.8%, limestone 22.2%. Clean hardwood sawdust is preferred, but softer wood sawdust may be used with very good results. However, the exact proportions of coke to sawdust will have to be varied with the character of the sawdust.

This floor covering will adhere tenaciously and uniformly to the foundation floor structure and protect it from moisture or other corroding liquids, act as an insulating lining for the floor protecting the interior of the car from either cold or heat beneath the car. At the same time it has sufficient elasticity to permit it to flex easily with the foundation floor structure and to present a resilient cushion to the foot; and it has a surface that is not slippery and does not generate dust under wear.

Figure 3:
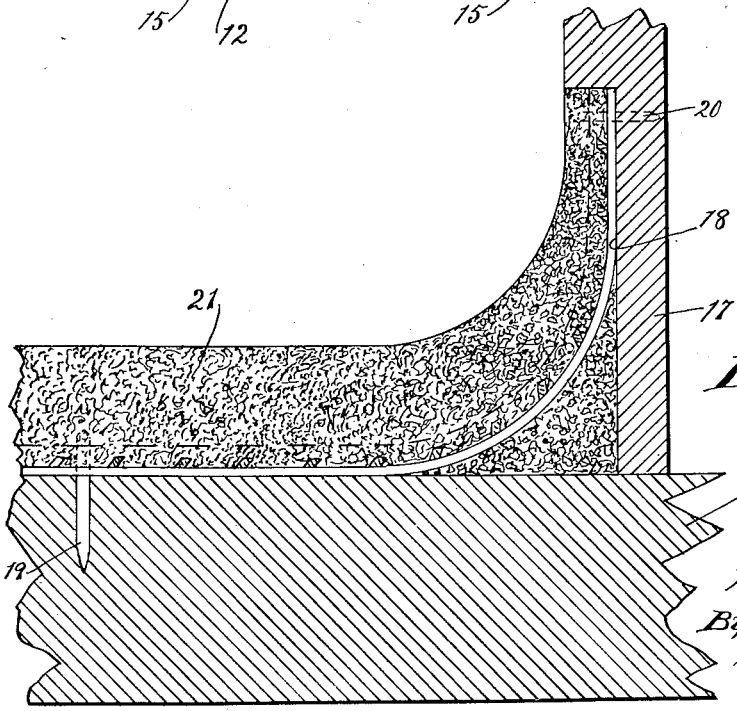
Fig. 3 is a partial sectional view, illustrating a car having a wooden floor covered in accordance with this invention.

While these characteristics make the covering particularly suited for use with a metal foundation structure it also combines well with the wooden foundation. For example, in Fig. 3, 16 indicates the wood floor and 17 the wood siding of a freight car, the latter being rabbeted adjacent to the floor, as indicated at 18. Expanded metal of greater width than the car is secured by staples 19 and has its edges turned up into the rabbets and secured to the siding by staples 20. 21 indicates a layer of bituminous concrete of the character above described, extending across the floor through and over the expanded metal and filling the rabbeted corners of the siding.

Use has been made of specific description and illustration in order to disclose the invention, but it is intended that nothing contained herein shall unnecessarily limit the following claims, or require a construction thereof that would permit the substance of the invention to be used without infringement.

I claim as my invention—

1. A floor for cars and the like comprising a foundation structure of sufficient strength to carry the load to be supported and to withstand the racking stresses to which it is subjected and a covering of asphaltic concrete forming the wearing surface of the floor having an aggregate including a cellular material in relatively large pieces and another material in fine particles.

2. A floor for cars and the like comprising a foundation structure of sufficient strength to carry the load to be supported and to withstand the racking stresses to which it is subjected and a covering of asphaltic concrete forming the wearing surface of the floor having an aggregate including a cellular material rich in relatively large pieces and lean in finer pieces and another cellular aggregate rich in smaller pieces.

3. A floor for cars and the like comprising a foundation structure of sufficient strength to carry the load to be supported and to withstand the racking stresses to which it is subjected, and a covering of asphaltic concrete forming the wearing surface of the floor having an aggregate including cork in coarse granular form and another material of mineral origin.

4. A floor for cars and the like comprising a foundation structure of sufficient strength to carry the load to be supported and to withstand the racking stresses to which it is subjected and a covering of asphaltic concrete forming the wearing surface of the floor having an aggregate including cellular vegetable matter, cellular mineral matter and a fine grained filler.

5. A floor for cars and the like comprising a foundation structure of sufficient strength to carry the load to be supported and to withstand the racking stresses to which it is subjected, and a covering of asphaltic concrete forming the wearing surface of the floor having an aggregate including coke in coarse granular form and a filler of fine granular form.

6. A floor for cars and the like comprising a foundation structure of sufficient strength to carry the load to be supported and to withstand the racking stresses to which it is subjected, and a covering of asphaltic concrete forming the wearing surface of the floor having an aggregate including coke and cork in granular form.

In testimony whereof I affix my signature.

WILLIAM H. LAWRENCE.